Figure 1:
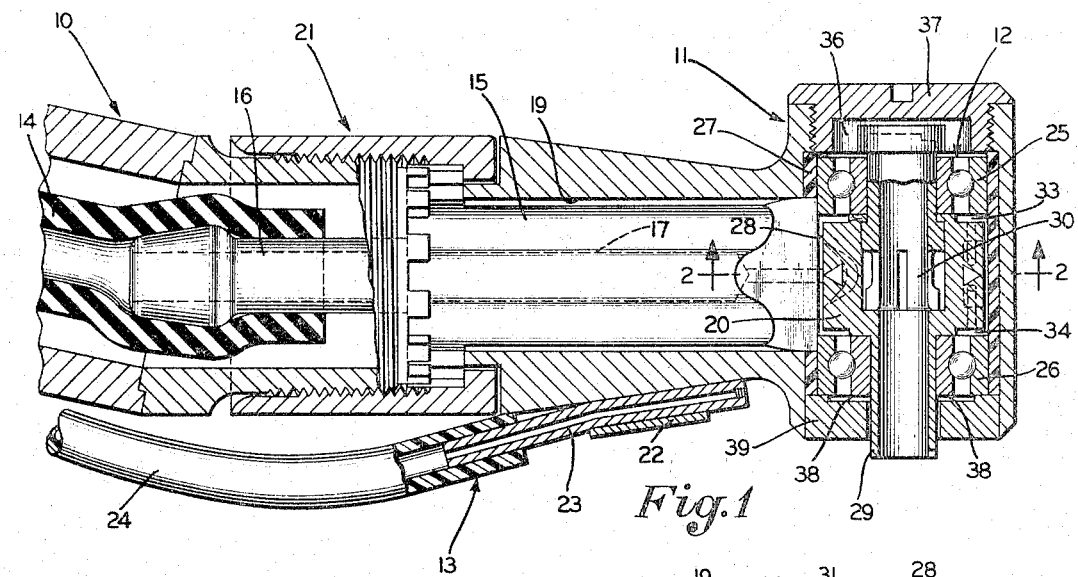

Jan. 17, 1967  J. A. MAURER  3,298,103
FLUID-DRIVEN DENTAL HANDPIECE CONSTRUCTION
Filed Jan. 3, 1958

INVENTOR.
John A. Maurer
BY
Frease & Bishop
ATTORNEYS

United States Patent Office 3,298,103
Patented Jan. 17, 1967

3,298,103
FLUID-DRIVEN DENTAL HANDPIECE
CONSTRUCTION
John A. Maurer, Canton, Ohio, assignor to The Weber Dental Manufacturing Company, Canton, Ohio, a corporation of Ohio
Filed Jan. 3, 1958, Ser. No. 707,060
12 Claims. (Cl. 32—27)

My invention relates generally to improvements in fluid-driven dental handpiece construction and more specifically to a means for cooling the bearings which rotatably mount the fluid turbine contained in such a handpiece, and also to an improved impelling means for such turbine. Furthermore, the present invention is an improvement on a copending application, Serial No. 618,325, filed October 25, 1956, and of which I am a co-inventor.

The fluid-driven dental handpiece construction disclosed in the above referred to copending application generally includes an elongated handle having a turbine casing mounted at one end thereof, with this turbine casing containing a fluid turbine and bearings rotatably mounting the fluid turbine within the casing. In addition, this prior construction includes fluid conduit means preferably extending through the handle for supplying fluid to the turbine for rotating the same, and a second fluid conduit means also preferably extending through the handle for exhausting fluid from the turbine. Finally the rotatably driven turbine is provided with means operably connected thereto for holding and rotating a dental burr.

In such a fluid-driven dental handpiece construction, the turbine therein is capable of operating at extremely high speeds in the order of between 100,000 and 200,000 revolutions per minute, so that it is necessary for the bearings rotatably mounting the turbine to also operate at these extremely high speeds. Thus there is presented a problem of eliminating the danger of these bearings overheating, since considerable heat will be generated by the bearings at these high speeds regardless of their particular construction and must be dissipated as readily as possible away from the bearings in order to prevent their premature failure and undesirable heating of the handpiece.

This problem, however, is not an easy one to solve in dental-handpiece construction, when it is considered that the handpiece must be of a minimum size in order to be conveniently held and properly controlled by a dentist using the same, and also in order to be of a size small enough that it may be inserted and properly operated in the patient's mouth. For this reason it is impossible to add any complicated and bulky attachments to the bearings for solving this problem.

It is, therefore, a general object of the present invention to provide a fluid-driven dental handpiece construction which includes means for cooling the bearings rotatably mounting the high-speed turbine thereof, with this means adding little, if any, size to the construction.

It is a primary object of the present invention to provide a fluid-driven dental handpiece construction in which at least a portion of the fluid used to rotate the high-speed turbine thereof is also used for cooling the bearings rotatably mounting this turbine.

It is a further object of the present invention to provide a fluid-driven dental handpiece construction in which the impelling means on the turbine thereof, that causes the fluid to rotate the turbine, is formed for directing part of this fluid directly around and through the bearings mounting the turbine for rotation, to thereby readily dissipate heat therefrom.

It is still a further object of the present invention to provide a fluid-driven dental handpiece construction having improved impelling means on the turbine thereof resulting in the turbine developing a higher torque for a given size, and also resulting in the portion of the fluid that is directed by this impelling means through the bearings being so directed at a higher pressure than it would be from normal impelling means.

It is also an object of the present invention to provide a fluid-driven dental handpiece construction in which the turbine casing enclosing the turbine and bearings may be formed for insuring this circulation of fluid around and through the bearings.

Finally it is an object of the present invention to provide a fluid-driven dental handpiece construction which accomplishes all of the above objects in a simple and efficient manner, yet may be provided at a minimum of expense.

These and other objects are accomplished by the parts, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms the fluid-driven dental handpiece construction comprising the present invention may be stated as including a preferably elongated handle member having a turbine casing mounted preferably at one end thereof and with this turbine casing enclosing a turbine assembly. The turbine assembly includes a turbine rotatably mounted in the turbine casing by bearing means, with this turbine preferably receiving fluid, preferably air under pressure, through the handle, and also preferably exhausting this fluid back through the handle.

Still further the turbine includes impelling means formed on the outer periphery thereof which receives the fluid for rotating the turbine, with this turbine rotation being transmitted to an operably connected dental burr holder. Also the bearing means and turbinne may be mounted encased in a plastic sleeve with this sleeve extending between the bearing means and turbine, and the turbine casing, for providing a muffle against the noise created by the operation of the turbine.

According to the principles of the present invention, the bearing means is positioned directly adjacent the portion of the turbine upon which the impelling means is formed and a communication is provided between the impelling means and the bearing means so that at least a portion of the fluid received by the impelling means will be transmitted around and through the bearing means for cooling the same. The turbine impelling means may be in the form of buckets in the outer periphery of the turbine with these buckets having side walls, and the bearing means may be two bearings, one mounted at either side of these buckets adjacent the turbine. In this form the communications may be holes formed through the bucket side walls opening adjacent the bearings and transmitting a portion of the fluid received by the buckets to the bearings.

Also according to the principles of the present invention, the side walls and preferably the back walls are formed so that they angle outwardly downwardly from the turbine outer periphery, to thereby form undercut portions at the sides and backs of these buckets which will serve to trap fluid therein. This form of buckets will not only direct fluid through the holes in the bucket side walls under a higher pressure than if such undercuts were not provided, but will also provide a greater torque for the turbine.

Still further recesses may be formed in the turbine casing adjacent the sides of the bearings opposite from the turbine so that fluid circulating through the bearings may circulate around these recesses and back through the bearings. Finally channel means may be provided between the bearings and the turbine for exhausting the fluid which has circulated through the bearings outwardly into the normal turbine exhaust conduit.

Figures 2, 3:
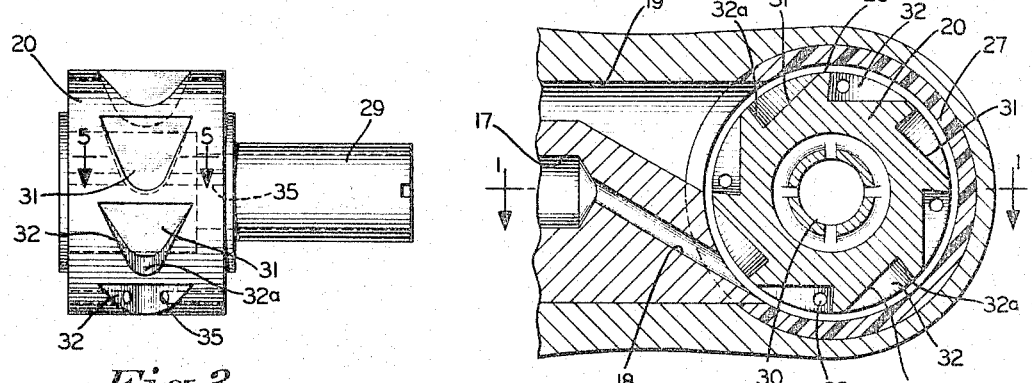
Figures 4, 5, 6:
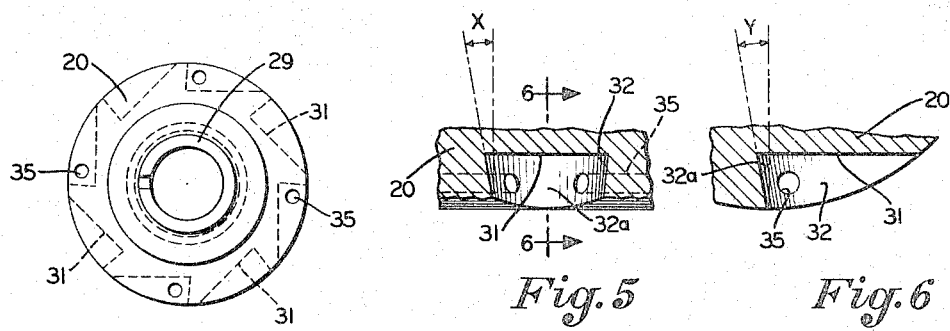

By way of example, an embodiment of the fluid-driven dental handpiece construction of the present invention is illustrated in the accompanying drawings forming a part hereof, wherein like numerals indicate similar parts throughout the several views, and in which:

FIG. 1 is a fragmentary vertical section, part in elevation, looking in the direction of the arrows 1—1 in FIG. 2;

FIG. 2, a fragmentary sectional view, part in elevation, looking in the direction of the arrows 2—2 in FIG. 1;

FIG. 3, a side elevation of the turbine removed from the handpiece of FIG. 1;

FIG. 4, a right-hand end view of the turbine of FIG. 3;

FIG. 5, a fragmentary sectional view, part in elevation, looking in the direction of the arrows 5—5 in FIG. 3; and FIG. 6, a fragmentary sectional view, part in elevation, looking in the direction of the arrows 6—6 in FIG. 5.

The fluid-driven dental handpiece construction comprising the present invention in general construction is preferably similar to the construction disclosed in the copending application Serial No. 618,325 referred to above, with the addition of the novel construction as herein disclosed and claimed. The main exceptions to this are that the muffler construction at the fluid supply and exhaust section of this prior construction may be eliminated and a conventional coolant attachment is provided in the present construction mounted on the outer periphery of the handle as will be hereinafter described in detail. Other slight differences will be apparent from the following description.

Referring to FIG. 1, the preferred embodiment of the present construction includes a hollow generally cylindrical elongated handle member, generally indicated at 10, having the turbine casing, generally indicated at 11, connected to one end of this handle, with the longitudinal axis of turbine casing 11 preferably extending substantially perpendicularly to the longitudinal axis of handle member 10 at their point of connection. The construction further includes a turbine assembly, generally indicated at 12, mounted in the turbine casing 11 extending coaxially therewith, a conventional coolant spray attachment, generally indicated at 13, and a fluid supply and exhaust section (not shown) mounted at the end of handle member 10 opposite from the turbine casing 11.

Handle member 10 is provided with a fluid-supply conduit preferably in the form of the fluid-supply tube 14, with tube 14 preferably extending from the supply and exhaust section through the major portion of handle 10 to the fluid-directing means 15, where it is connected to the nipple 16 forming a part of this directing means. Fluid-directing means 15 is provided with a longitudinally extending opening 17 connecting with nipple 16 and terminating in a particularly formed nozzle portion 18, with portion 18 opening into and directing fluid into the turbine casing 11.

Handle member 10 is also preferably provided with a fluid exhaust conduit again preferably extending the length of the handle member connecting the turbine casing 11 and the supply and exhaust section. This exhaust conduit communicates with the turbine casing 11 and is formed adjacent the turbine casing by the openings 19 extending along one side of the fluid-directing means 15 after which this conduit is formed within handle member 10 around nipple 16 and supply tube 14 to the supply and exhaust section.

The fluid-directing means 15 is preferably received positioned in the handle by means of a press fit and the nozzle portion 18 is formed in a particular exact manner as shown in order to properly supply and properly direct fluid to a turbine 20, forming a part of the turbine assembly 12 in the turbine casing 11, for rotating this turbine.

Handle member 10 may be further provided with the connection assembly 21 which permits the handle member to be disconnected intermediate the length thereof for positioning the turbine casing 11 extending from the handle member in the direction desired.

The conventional coolant spray attachment 13 is mounted on the outer periphery of handle member 10 for directing a jet of coolant toward a dental burr mounted in the turbine assembly 12 as will be hereinafter described. This coolant spray attachment 13 is mounted on handle member 10 by means of the clip 22 which receives the coolant directing nozzle 23, and the nozzle 23 is supplied with coolant by the coolant supply tube 24.

The turbine assembly 12 includes the turbine 20, which is rotatably mounted coaxially in the turbine casing 11 by bearing means in the form of the ball bearings 25 and 26. Further turbine 20 and bearings 25 and 26 may be encased within the turbine casing by a plastic muffle sleeve 27, which sleeve extends between bearings 25 and 26 and the turbine casing, and also extends over the outer peripheral surface 28 of turbine 20 except at the point of connection between handle member 10 and turbine casing 11. Thus, sleeve 27, as shown in the drawings, forms the inner axial surface of casing 11, and therefore may be regarded as a part of casing 11.

A burr holder 29 is preferably integrally formed at least partially within turbine 20 extending coaxially with turbine 20 and the turbine casing 11. Burr holder 29 may include the collet 30 for holding the upper end portion of a dental burr (not shown), so that upon rotation of the turbine 20 this dental burr is rotated.

Turbine 20 is provided with impelling means at the outer peripheral surface 28 thereof, preferably in the form of a series of circumferentially spaced turbine buckets 31. Buckets 31 extend from the surface 28 down into the turbine 20 to thereby form chambers having the bucket side walls 32.

The turbine buckets 31 are preferably formed with the side walls 32 thereof angled outwardly downwardly into the confines of the buckets 31 so that these buckets increase in width from the outer surface of turbine 20 inwardly, as shown in FIG. 5, to thereby form undercuts at either side of the buckets. The back walls 32a of these buckets are also preferably formed in a similar manner so that undercuts are again formed at these points, as shown in FIG. 6.

The angling of these side walls 32 are shown as angle X in FIG. 5, and the angling of the back walls 32a is shown as angle Y in FIG. 6. It is preferred that both angles X and Y be in the order of four degrees for providing the advantages hereinafter described.

Further, bearings 25 and 26 are preferably positioned one at either end adjacent the peripheral surface 28 of the turbine, with the turbine preferably being formed adjacent these bearings with the channel 33 adjacent bearing 25 and the channel 34 adjacent bearing 26. Channels 33 and 34 open outwardly along the turbine peripheral surface 28 and communicate with the openings 19 between the handle member 10 and fluid directing means 15, to thereby communicate with the exhaust conduit.

Openings 35 are formed through the bucket side walls 32 with these openings preferably being formed through both of the side walls 32 of selected alternate buckets 31, as shown, so that half of the openings 35 communicate between the selected buckets 31 and the channel 33 adjacent bearing 25, and the other half communicate between the same buckets 31 and the channel 34 adjacent the bearing 26. Further, a recess 36 is formed in the turbine casing 11 at the side of the bearing 25 opposite from turbine 20 preferably within the cap 37 which is threadably received in casing 11, and a recess 38 is formed at the side of bearing 26 opposite from turbine 20 preferably within the cap 39 received by press fit in casing 11 surrounding a portion of the burr holder 29.

Thus, according to the principles of the present invention, fluid, preferably air under pressure, is received from the nozzle portion 18 of fluid-directing means 15 within handle member 10, and is directed into the turbine buckets 31 of turbine 20 to rotate this turbine and thereby rotate a dental burr positioned and held in the burr holder 29. The major portion of this fluid preferably is directly exhausted from turbine buckets 31 into the openings 19 formed between the handle member 10 and fluid-directing means 15, which openings form a part of the exhaust conduit. Further, as is obvious from FIG. 2, the fluid received in each bucket 31 is effectively confined in that particular bucket, between the bucket and the turbine casing 11, during the travel of the bucket from nozzle portion 18 circumferentially around to openings 19.

A portion of this fluid received by the turbine buckets 31 having the openings 35 formed in the side walls 32 thereof will, however, be communicated through the openings 35 and channels 33 and 34 directly around and through each of the bearings 25 and 26. This portion of the fluid will circulate around bearings 25 and 26, through bearing 25 into recess 36 and through bearing 26 into recess 34.

After circulating in recess 36, the fluid will recirculate back through bearing 25 into channel 33 and then into the exhaust conduit within handle member 10. The same circulation will take place from recess 38 through bearing 26 into channel 34 and ultimately into the exhaust conduit, but a small portion of this fluid may exhaust outwardly between cap 39 and burr holder 29.

With the buckets 31 of turbine 20 being formed with side walls 32 angled and the back walls 32a angled, as hereinbefore described, as the fluid from the fluid-directing means 15 is received in the buckets 31, the undercuts formed by these angled side and back walls will trap a portion of the fluid within the buckets maintaining a higher fluid pressure than if these undercuts were not provided. Also, since a portion of the fluid is trapped in the undercuts at the side walls 32 and this fluid is maintained at a higher pressure, the portion of the fluid passing through the openings 35 will be more positive and maintained at a higher pressure.

In this manner, according to the principles of the present invention, the heat generated by the rotation of bearings 25 and 26 is dissipated by circulating at least a portion of the fluid used to drive the turbine buckets directly around and through these bearings so that danger of overheating of the bearings is completely eliminated and the life thereof greatly extended. This cooling of these bearings takes on an extreme importance when it is realized that turbine 20 is capable of operating at speeds in the order of between 100,000 and 200,000 revolutions per minute.

Furthermore, not only is a greater thrust on the turbine 20 obtained from the fluid resulting from the undercuts formed from the angled sides 32 and backs 32a of the buckets, providing a greater torque for the turbine, but also proper circulation of a portion of the fluid, due to the pressure thereof being maintained, is insured through the openings 35 to the bearings 25 and 26. Thus, due to the particular construction of the turbine buckets 31, a greater torque is available for rotating the burr holder 29 and a dental burr mounted therein, and a positive circulation of a portion of the fluid is insured through the bearings 25 and 26 for cooling these bearings.

Another important feature to be pointed out is that, although efficient circulation of the fluid around bearings 25 and 26 is provided by the recesses 36 and 38 in the turbine casing 11 and the channels 33 and 34 in the turbine 20, the provision of this circulating system adds little, if any, size to the over-all dimensions of the handle member 10 and turbine casing 11, since the major portion of this space would otherwise be required for other purposes in order for the turbine casing to enclose the complete turbine assembly 12. Also, because of the directness of the communication between the turbine buckets 28 through the turbine side walls 32, not only is this space savings accomplished, but it is not necessary to provide extra expensive conduits, and the circulation system operates with a maximum of efficiency because of its directness.

Finally, it is pointed out that, because of the directness of this circulation system and the fact that a portion of the fluid normally driving the turbine 20 is used for this cooling purpose, added supply means to provide such cooling is not required nor again is added conduit space required. Thus, the almost absolute requirement that the bearings of this high-speed turbine be cooled is accomplished in a simple and inexpensive manner with a maximum of efficiency.

In the foregoing description, certain terms have been used for brevity, clearness and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous new and useful results obtained thereby; the new and useful construction and reasonable mechanical equivalents thereof obvious to those skilled in the art are set forth in the appended claims.

I claim:

1. Fluid-driven dental handpiece construction including an elongated handle member having an end portion, turbine casing means connected to said handle end portion, a turbine mounted in the turbine casing means, bearing means axially rotatably mounting the turbine in the turbine casing means, means for supplying fluid to the turbine, means for exhausting fluid from the turbine, means operably connected to the turbine and rotatable therewith for holding a dental burr, the turbine having turbine bucket means formed in a portion of said turbine receiving fluid from the means for supplying fluid to rotate said turbine, the turbine bucket means forming chambers confining fluid received from the means for supplying fluid, the bearing means being positioned axially adjacent said turbine portion, and the turbine having opening means formed generally axially therein from certain of the bucket means directly to the bearing means for transmitting a portion of the fluid received by said bucket means around and through said bearing means for cooling said bearing means.

2. Fluid-driven dental handpiece construction as defined in claim 1 in which the turbine bucket means includes a series of spaced buckets having spaced side walls; and in which the opening means includes openings formed from certain of said buckets generally axially through certain of said bucket side walls to a point adjacent the bearing means.

3. Fluid-driven dental handpiece construction as defined in claim 2 in which the turbine has end portions adjacent the turbine buckets; in which the bearing means includes a bearing positioned adjacent each of said end portions; and in which the openings formed from certain of the buckets generally axially through certain of the bucket side walls open adjacent each of said bearings.

4. Fluid-driven dental handpiece construction as defined in claim 3 in which recess means is formed in the turbine casing means at the side of each of said bearings opposite from said turbine for permitting at least a portion of the fluid cooling the bearings to circulate through the bearings into said recess means and back through the bearings.

5. Fluid-driven dental handpiece construction as defined in claim 4 in which channel means is formed adjacent each of the turbine end portions between said turbine end portions and each of the bearings communicating with the means for exhausting fluid from the turbine for permitting at least a portion of the fluid cooling said bearings to circulate through the bearings into the recess means, back through the bearings and into the means for exhausting fluid from the turbine.

6. Fluid-driven dental handpiece construction including a handle member, turbine casing means connected to said handle member, a turbine mounted in the turbine casing means and having a periphery, bearing means axially rotatably mounting the turbine in the turbine casing means, means for supplying fluid to the turbine, means for exhausting fluid from the turbine, means operably connected to the turbine and rotatable therewith for holding a dental burr, the turbine having a series of circumferentially spaced turbine buckets formed in the periphery of said turbine receiving fluid from the means for supplying fluid to rotate said turbine, said turbine buckets having side and back portions, at least said bucket side portions angling outwardly downwardly from said turbine periphery forming turbine side walls having undercut portions at said side portions trapping fluid in said buckets, the turbine buckets forming chambers confining the fluid received from the means for supplying fluid, the bearing means being positioned closely axially adjacent said turbine, and the turbine having opening means formed therein from at least certain of the buckets directed generally axially to the bearing means for transmitting a portion of the fluid received by said buckets around and through said bearing means for cooling said bearing means.

7. Fluid-driven dental handpiece construction as defined in claim 6 in which the turbine opening means includes openings formed from said certain buckets generally axially through certain of said certain bucket side walls to a point adjacent the bearing means; in which the turbine has end portions adjacent the turbine buckets; in which the bearing means includes a bearing positioned adjacent each of said end portions; and in which the openings formed through certain of the certain bucket side walls open adjacent each of said bearings.

8. Fluid-driven dental handpiece construction as defined in claim 7 in which recess means is formed in the turbine casing means at the side of each of said bearings opposite from said turbine for permitting at least a portion of the fluid cooling the bearings to circulate through the bearings into said recess means and back through the bearings.

9. Fluid-driven dental handpiece construction as defined in claim 8 in which channel means is formed adjacent each of the turbine end portions between said turbine end portions and each of the bearings communicating with the means for exhausting fluid from the turbine for permitting at least a portion of the fluid cooling said bearings to circulate through the bearings into the recess means, back through the bearings and into the means for exhausting the fluid from the turbine.

10. Fluid-driven turbine construction including a turbine having a periphery and end portions adjacent ends of the periphery, a bearing adjacent each of the turbine end portions rotatably mounting the turbine for rotation, means for supplying fluid to the turbine, the turbine having a series of circumferentially spaced turbine buckets formed in the periphery of said turbine receiving fluid from the means for supplying fluid to rotate said turbine, said turbine buckets having side and back portions, at least said bucket side portions angling outwardly downwardly from said turbine periphery forming undercut portions at said side portions trapping fluid in said buckets, and the turbine having opening means formed therein from at least certain of the buckets through said certain bucket side walls directly to and opening adjacent each of said bearings for transmitting a portion of the fluid received by said buckets around and through said bearings for cooling said bearings.

11. Fluid-driven turbine construction including a turbine having a periphery, bearing means axially rotatably mountting the turbine for rotation, means for supplying fluid to the turbine, the turbine having a series of circumferentially spaced turbine buckets formed in the periphery of said turbine receiving fluid from the means for supplying fluid to rotate said turbine, the turbine buckets forming chambers confining fluid received from the means for supplying fluid, the bearing means being positioned closely axially adjacent said turbine, and the turbine having opening means formed therein from at least certain of the buckets directed generally axially to the bearing means for transmitting a portion of the fluid received by said buckets around and through said bearing means for cooling said bearing means.

12. Fluid-driven turbine construction as defined in claim 11 in which the turbine buckets have side walls; in which the turbine opening means includes openings formed from said certain buckets generally axially through certain of said certain bucket side walls to a point adjacent the bearing means; in which the turbine has end portions adjacent the turbine buckets; in which the bearing means includes a bearing positioned adjacent each of said end portions; and in which the openings formed through certain of the certain bucket side walls open adjacent each of said bearings.

References Cited by the Examiner

UNITED STATES PATENTS

| | | | |
|---|---|---|---|
| 780,971 | 1/1905 | Boekel et al. | 253—2 X |
| 2,180,993 | 11/1939 | Monnier | 32—26 X |
| 2,283,314 | 5/1942 | Ckola | 15—24 |
| 2,945,299 | 7/1960 | Fritz | 32—27 |

FOREIGN PATENTS 418,099  2/1947  Italy.

References Cited by the Applicant

UNITED STATES PATENTS

| | | |
|---|---|---|
| 2,251,057 | 7/1941 | Iseman. |
| 2,669,420 | 2/1954 | Holzwarth. |
| 2,732,671 | 1/1956 | McFadden. |
| 2,799,934 | 7/1957 | Kern. |

RICHARD A. GAUDET, *Primary Examiner.*

ROBERT E. MORGAN, *Examiner.*

J. R. KLINE, H. B. WHITMORE, R. J. HOFFMANN,
*Assistant Examiners.*